Figure 1:
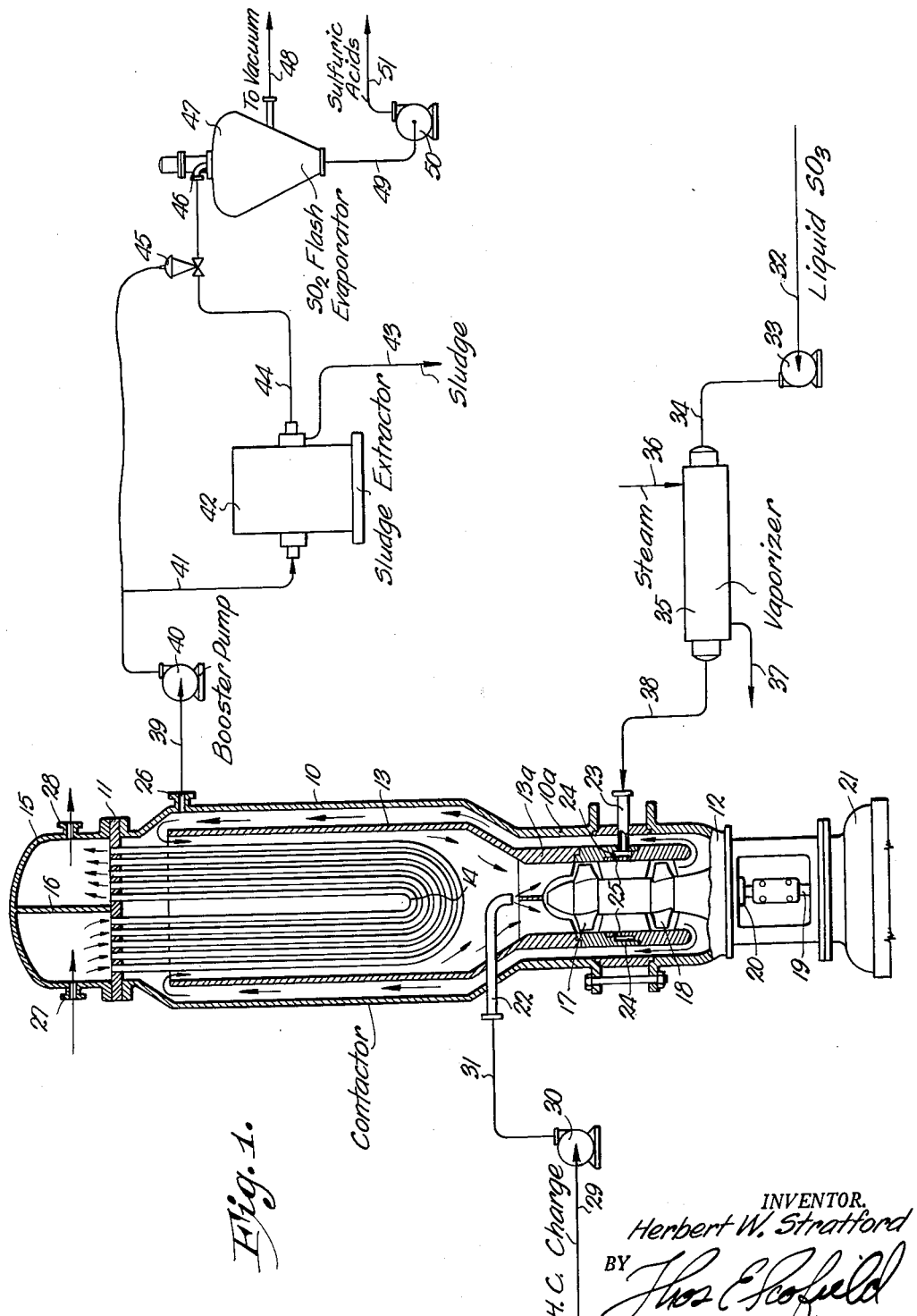

Oct. 2, 1962   H. W. STRATFORD   3,056,831
SULFUR TRIOXIDE SULFONATION METHOD
Filed April 25, 1958

INVENTOR.
Herbert W. Stratford
BY
Thos E Scofield
ATTORNEY.

United States Patent Office 3,056,831
Patented Oct. 2, 1962

3,056,831
SULFUR TRIOXIDE SULFONATION METHOD
Herbert W. Stratford, Kansas City, Mo., assignor to Stratford Engineering Corporation, Kansas City, Mo., a corporation of Delaware
Filed Apr. 25, 1958, Ser. No. 730,848
5 Claims. (Cl. 260—505)

This invention relates to methods and apparatus of and for sulfonating organic sulfonatable compounds with sulfur trioxide as the sulfonating agent to produce products substantially free of undesirable by-products of the sulfonating agents.

Petroleum sulfonates have a wide range of uses, for example, they may be used as synthetic detergents which are used as substitutes for soap and have particular value as blending agents for lubricating oils in which they act as detergents and corrosion inhibitors. Petroleum sulfonates may be prepared by contacting a petroleum oil with oleum and converting the resultant acid oil to sulfonates. However, petroleum sulfonates produced by this process are of only fair quality and are obtained in only moderate yields due to large amounts of sludge formed in the acid contacting step. The sludge contains sulfonic acids which, however, are in an unuseable form in the sludge and, therefore, these valuable acids are lost with the discarded sludge. A further disadvantage of the formation of large amounts of sludge is that the sludge is difficult to separate and a substantially sludge-free acid oil is required to produce good quality sulfonates.

Petroleum sulfonates may also be produced by contacting a petroleum oil with sulfur trioxide and converting the resulting acid oil to sulfonates. This method produces somewhat higher yields than are obtainable with oleum because the volume of sludge is materially reduced and, therefore, less of the useable sulfonic acids are lost. However, sulfonation of petroleum oils with sulfur trioxide presents difficulties in that sulfur trioxide reacts violently and often forms sulfonates as well as a very stiff sludge thus causing sulfonic acid losses and complicating the operation.

It has been generally recognized in the sulfonation art that sulfur trioxide in its free form theoretically provides an ideal sulfonating agent because of its highly reactive nature and because it sulfonates organic compounds without the simultaneous production of water as a by-product, thus eliminating the formation of a sulfuric acid phase in the reaction mixture which is difficult to separate therefrom and which, in the use of other sulfonating agents such as oleum, concentrated sulfuric acid, and others, represents a waste of reagent and involves useless processing procedures in separating the same from the sulfonating reaction mixture. It has also become apparent in the sulfonation art that, in order to utilize sulfur trioxide directly as a sulfonating agent for most organic compounds, some means of controlling the extreme reactivity of the sulfur trioxide must be provided if the product is to be relatively free of colored impurities, such as resinous and carbonaceous discoloration products of the organic charging stock.

Therefore, an object of the invention is to provide methods of and apparatus for contacting a petroleum oil with sulfur trioxide wherein the violence of the acid contacting step is closely controlled and regulated and the volume of sludge formed is greatly reduced and closely controlled and regulated, thus minimizing sulfonic acid losses in the process.

Another object of the invention is to provide methods for producing sulfonates free of by-products of the reaction of sulfur trioxide with reagents utilized in the sulfonation process.

Another object of the invention is to provide methods of and apparatus for producing substantially pure sulfonic acids or neutral sulfonate salts.

Another object of the invention is to provide methods of and apparatus for sulfonating organic sulfonatable compounds which will produce a light colored, uniform product.

Another object of the invention is to provide methods of and apparatus for sulfonating organic sulfonatable compounds wherein the product itself (sulfonic acid) may be employed as a suppressant to minimize polymerization and the formation of disulfonates and sulfones.

Another object of the invention is to provide methods of and apparatus for sulfonating organic sulfonatable compounds with sulfur trioxide as a sulfonating agent wherein a much more uniform sulfonic acid is produced and the sulfonatable material is dispersed in the sulfonic acid product prior to sulfonation.

Another object of the invention is to provide methods of and apparatus for sulfonating organic sulfonatable compounds with sulfur trioxide wherein a controlled reaction temperature for sulfonation is maintained by establishing a large cyclic stream of reaction product through a reaction vessel having heat exchange elements therein.

Another object of the invention is to provide methods of and apparatus for sulfonating organic sulfonatable compounds with sulfur trioxide as the sulfonating agent wherein a relatively short process time is employed to produce a uniform sulfonic acid, the total expired time from the input of charged stock to neutralization of the sulfonic acid requiring only a few minutes.

Still another object of the invention is to provide methods of and apparatus for sulfonating organic sulfonatable compounds with sulfur trioxide as the sulfonating agent wherein a relatively complete separation of the sulfonic from the sulfuric acids to give a substantially inorganic acid-free sulfonic acid is provided and wherein flash evaporation is employed to further lower the amount of $SO_2$ present in the sulfonic acid prior to neutralization.

Other and further objects of the invention will appear in the course of the following description thereof.

In the drawing, which forms a part of the instant invention and is to be read in conjunction therewith, an embodiment of the invention is shown.

The single FIGURE is a schematic diagram of a sulfonation process utilizing sulfur trioxide as the sulfonating agent with parts broken away and in section of one element of the schematic diagram.

The present process is applicable to any feed stock which may be contacted with sulfur trioxide to effect sulfation or sulfonation thereof at the reaction conditions found to be suitable for the reaction. In specifying herein a "sulfonation process," a "sulfonatable organic compound," a "sulfonating agent," and "sulfonating conditions," it is intended that the use of the term "sulfonate" and derivative terms include reactions in which sulfonation is the end of the process as well as reactions in which sulfonation characterizes the end product.

Organic compounds within the broad class of sulfonatable organic charging stocks include such compounds as the phenols and alkyl phenols; alcohols of both the aliphatic and alicyclic series, aromatic hydrocarbons such as the various benzene derivatives containing a nuclearly displaceable hydrogen atom which may be occupied by a sulfo radical and the polycyclic aromatic hydrocarbons containing napthyl, phenanthryl and anthryl nuclei; olefinic hydrocarbons, such as octene, decene, etc., and cycloolefins or their alkyl derivatives such as cyclohexene and ethylcyclohexene; heterocyclic compounds such as thiophene, pyridine and the like; ethers and esters such as phenylmethyl ether and the fatty acid glycerides, respectively, the latter class also including such compounds as the glyceride mono-ester of oleic acid, etc.; acids, such as benzoic acid and the aliphatic acids, particularly those containing an olefinic linkage such as oleic acid, and other compounds containing a replaceable hydrogen atom as well as various derivatives of the above classes of compounds containing noninterfering substituents, such as one or more halogen, nitro, amino, keto, carboxyl, etc., groups.

The advantages of the present method of sulfonation are especially evident in the production of alkyl aromatic sulfonic acids which, when neutralized with a suitable basic reagent, such as an alkali metal hydroxide, an amine, or an alkanol amine, form highly effective detergent compounds. Suitable alkyl aromatic hydrocarbons and alkylated phenols sulfonatable by the present process to form detergents or detergent intermediates include, among others, the alkylated mono- and bicyclic aromatic compounds and phenols such as nonylbenzene, decylbenzene, dodecylbenzene, dodecyltoluene, pentadecylbenzene, pentadecyltoluene, amylnaphthol, amylnaphthalene, nonylphenol, decylphenol and other long-chain substituted mono- and bicyclic aromatic hydrocarbons, phenols and naphthols.

The sulfated and sulfonated products of these charging stocks are ordinarily utilized in the form of their neutral salts in inorganic bases, such as sodium hydoxide, and when utilized as detergents for certain purposes, it becomes desirable in many instances to provide a product which is substantially free of inorganic salts such as the reaction product of the base and any excess sulfonating agent which may be utilized in effecting the sulfonation reaction, such as sodium sulfate formed by adding sodium hydroxide to a sulfonation reaction mixture containing an excess of the sulfonating agent.

The active component of the sulfonating agent utilized in the present process which produces the sulfate or sulfonic acid derivative of the sulfonatable organic compound charged to the process is sulfur trioxide in any of its various physical modifications. This reagent has become commercially available in three forms: the so-called "alpha" form which is a solid asbestos-like material melting at 62° C. and generally considered to be sulfur trioxide polymer, the "beta" form, believed to be a polymeric sulfur trioxide which is solid at normal temperatures and melts at about 33° C. and the "gamma" form which is a normally liquid physical modification of the sulfur trioxide at room temperature which melts at 17° C. Any of the above physical modifications of sulfur trioxide may be utilized in the present process, when vaporized into the gaseous phase or state in accordance with the procedure herein provided. The sulfur trioxide preferably employed in my invention is gaseous sulfur trioxide. The sulfur trioxide may contain a diluent gas, for example, air, nitrogen or sulfur dioxide.

FIG. 1 shows a schematic flow diagram for the use of sulfur trioxide in a sulfonation process associated with a detailed cross section of a vertical contactor operable in such process. The construction of the contactor will be first described.

Referring then to FIG. 1, and the cross-sectional view of the contactor, outer shell 10 is closed at its upper end by a tube sheet 11 and at the other end by an hydraulic pumping head 12. Within the outer shell 10 is supported a circulating tube 13 open at both ends for free communication with the space within the outer shell and having a portion of lesser diameter 13a positioned within the lesser diameter portion 10a of the outer shell. If desired, the entire circulating tube 13 may be of the diameter of the lesser diameter portion 13a, and, if so, the diameter of the outer shell 10 would be the same throughout as that at 10a. Heating or cooling elements 14 in the form of U-bends made of tubing are rolled into or otherwise attached to tube sheet 11. These elements extend through the open end of the circulating tube 13 and occupy any desired portion of the space enclosed by the circulating tube 13.

A typical heat exchange channel or cover 15 equipped with a central partition or baffle 16 is provided by distribution of heating or cooling medium to the transfer elements 14. A pair of pumping impellers 17 and 18 are preferably located in the lesser diameter portion of the circulating tube 13 at the end opposite the tube sheet 11. These impellers are mounted on a shaft 19 rotating in a bearing in the pumping head 12 and sealed by a packing gland 20. The impellers are driven by any suitable prime mover, such as a driving motor, turbine, or engine, shown diagrammatically at 21. Inlet nozzle 22 is provided for feeding one component of the mixture to the apparatus and input nozzle 23 connected to circumferential channel 24 and plural input ports 25 are provided for feeding the other component of the mixture thereto. Nozzle 22 is positioned between the heat exchange elements and the impeller 17, while the inlet ports 25 are positioned between the two impellers.

Impellers 17 and 18 are arranged for taking suction from the circulating tube 13 and discharging into the hydraulic head 12 where the flow of fluids is reversed and directed into the annular space between the outer shell and the circulating tube. The inlet nozzles 22 and 23 extend through the outer shell and are sealed into the inner circulating tube to discharge the components on the upstream sides of the impellers. Nozzle 26 is provided in the outer shell for withdrawing the finished blend of components. Channel 15 is provided with an input connection 27 and an output connection 28 for the cooling medium.

Referring now to the process, charge oil is input to nozzle 22 through line 29, pump 30 and line 31. Liquid sulfur trioxide is input through line 32, pump 33, and line 34 to vaporizer 35. Steam is input to the vaporizer jacket through line 36 and output therefrom through line 37. The vaporized sulfur trioxide is then input to nozzle 23 by line 38. Product is withdrawn through line 39 from nozzle 26, passed through pump 40 and line 41 to sludge extractor 42. A sludge extractor as shown in Patent No. 2,670,132, inventor Walter J. Podbielniak, issued February 23, 1954, "Centrifugal Countercurrent Contact Apparatus," is suitable for this purpose. From the sludge extractor 42, sludge is discharged through line 43 while the sludge extracted reaction product is passed through line 44 controlled by back pressure valve 45 to the input connection 46 of flash evaporator 47. Sulfur dioxide is withdrawn through line 48 to vacuum and the product is withdrawn from the bottom of the flash evaporator through line 49, pump 50 and line 51.

The sulfonation of either naturally occurring hydrocarbons or synthetics may be accomplished by employing a vaporized $SO_3$ as the sulfonating agent. It is essential that the vaporized $SO_3$ be introduced into the reactor in a separate zone from the hydrocarbon charge stock and that, further, the hydrocarbon to be sulfonated be dispersed intimately with the sulfonic acid in the system prior to the sulfonation reaction with the vaporized $SO_3$.

I have also found that it is absolutely essential to have a vertical contacting vessel for this operation so as to maintain a uniform circulation within the contactor. The two impeller contactor shown is employed in this instance and the top impeller 17 serves to maintain circulation through the heat exchanger located immediately above it, as well as to disperse thoroughly the hydrocarbon to be sulfonated in the cyclic stream of sulfonic acid. The lower impeller 18 serves to intimately mix the sulfonic acid and hydrocarbon with a vaporized $SO_3$ that is injected immediately above it to promote a uniform reaction at a controlled temperature.

When employing a reactor as shown in FIG. 1, I have been able to successfully sulfonate various lube fractions, dodecylbenzene and polydodecylbenzene. It is essential that the hydrocarbon charge stock be rigidly controlled as to feed rate, and that the $SO_3$ be accurately fed to the contactor so the mol ratio of hydrocarbon-$SO_3$ is proper.

In the case of dodecylbenzene having a molecular weight of 246, the ratio is 246 grams of dodecylbenzene to 80 grams plus 5% of $SO_3$. The 5% excess of $SO_3$ is employed to insure complete sulfonation without being in sufficient excess to cause polymerization, disulfonation, and the like.

The sulfonic acid from the contactor is fed through line 41 to the sludge extractor 42 for sludge separation followed by degasification in the flash evaporator 47. This equipment is required for the sulfonation of naturally occurring hydrocarbons and polydodecylbenzene. When sulfonating dodecylbenzene, such a small quantity of inorganic acid remains in the sulfonic acid that it is not necessary to employ any other apparatus than the contactor 10 and its auxiliary charge pump 30 to produce a satisfactory sulfonic acid to be neutralized for the manufacture of household detergents.

A typical flash evaporator operable in the position indicated at 47 is shown in my own application Serial No. 687,952, filed October 3, 1957, now U.S. Patent No. 2,990,011, and entitled "Flash Evaporator Rotor." In the flash evaporator 47, the sludge stripped reaction product is forced at high velocity through an orifice of restricted width into a zone of low pressure to remove sulfur dioxide and thus reduce the amount of inorganic acids present in the reaction product.

As previously mentioned, extremely accurate flow control is necessary on all charge stocks to the contactor 10 and a uniform reaction temperature is maintained therewithin. Intimate dispersion is a prime requirement within the sulfonation contactor 10, as well. The new arrangement of this sulfonation process lies within the vertical contactor 10. It is universally felt throughout the industry that when sulfonating, a suppressant of some sort is essential to produce a light colored, uniform product. In a number of instances, diluents of various types are employed to act as a suppressant. Such diluents may include sulfur dioxide, sulfuric acid or an unsulfonatable hydrocarbon compound.

In my process, I purposely feed the sulfonatable material into the contactor at a point where it is uniformly dispersed in a large cyclic flowing stream of sulfonic acid before being reacted with the sulfur trioxide charge to the contactor. This enables me to employ the product itself (sulfonic acid) as a suppressant to minimize polymerization and the formation of disulfonates and sulfones. In other words, I am able to produce a much more uniform sulfonic acid than is known to the art through the use of the vertical double impeller contactor by dispersing sulfonatable material in the sulfonic acid prior to sulfonation by sulfur trioxide.

It is also extremely essential to maintain a controlled reaction temperature for sulfonation, particularly with the sulfur trioxide agent, which I am able to do by maintaining a large cyclic stream through the heat exchanger within the contactor. Another important criterion in producing a uniform sulfonic acid is to maintain a reasonable short process and residence time in the apparatus. By employing a contactor of the construction shown, a sludge extractor as shown in Patent No. 2,670,132 and a flash evaporator such as disclosed in my application Serial No. 687,952, now U.S. Patent No. 2,990,011, operating with a low inventory, the total expired time from the charge stock to neutralization of the sulfonic acid is only a matter of a few minutes. I feel that five minutes is properly the maximum time desirable. To further produce a high quality sulfonate, I employ a flash evaporator for the purpose of degasifying the sulfonic acid to lower the amount of inorganic acids present in the sulfonic acid prior to neutralization.

Basically, in sulfonation, there are two popular products desired, one being a water soluble sulfonate which has a molecular weight normally below 400, and the other an oil-soluble sulfonate which has a molecular weight in the range of 400 to 600. There is no fine line of distinction between these two types of products and, in some instances, they are both water and oil-soluble. Normally, the charge stock that is sulfonated determines largely the type of sulfonate that is produced. My process is applicable to the production of both these types of products.

From the foregoing it will be seen that this invention is one well adapted to attain all of the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. In a method of reacting a liquid reactant selected from the group consisting of petroleum oil, dodecylbenzene and polydodecylbenzene, with sulfur trioxide to form a sulfonic acid wherein a closed cyclic flowing stream of sulfonic acid is circulating in a flowing stream axially and peripherally of a vertically oriented circulating tube in a vertically oriented closed reaction vessel, the improvement of introducing said liquid reactant into said flowing stream at an upmost point, mechanically agitating and impelling said stream immediately after and below said first introduction to thoroughly mix and disperse the liquid reactant in the stream, introducing sulfur trioxide into the mixed flowing stream immediately after and below said first mixing, and mechanically agitating said stream a second time immediately below and following the introduction of the sulfur trioxide to thoroughly mix and disperse said sulfur trioxide in the flowing stream so as to initiate the desired reaction, and withdrawing sulfonic acid reaction product from the stream.

2. A method as in claim 1 including the step of heat exchanging the cyclic flowing stream immediately after the second mixing step.

3. A method as in claim 1 wherein the liquid reactant is introduced centrally of said flowing stream.

4. A method as in claim 1 wherein said sulfur trioxide is introduced peripherally of said flowing stream.

5. A method as in claim 1 wherein said liquid reactant is introduced centrally of said flowing stream and said sulfur trioxide is introduced peripherally of said flowing stream.

References Cited in the file of this patent

UNITED STATES PATENTS

| | | |
|---|---|---|
| 2,577,856 | Nelson | Dec. 11, 1951 |
| 2,720,447 | Jones et al. | Oct. 11, 1955 |
| 2,726,261 | Martin | Dec. 6, 1955 |
| 2,762,682 | Van de Wateren | Sept. 11, 1956 |
| 2,782,230 | Seaton | Feb. 19, 1957 |
| 2,807,641 | Milner et al. | Sept. 24, 1957 |
| 2,828,331 | Marisic et al. | Mar. 25, 1958 |

FOREIGN PATENTS

| | | |
|---|---|---|
| R9512 IV b/120 | Germany | May 30, 1956 |